No. 648,379. Patented May 1, 1900.
A. BENNETT.
BREAD RAISING AND CLOTHES DRYING DEVICE.
(Application filed Feb. 14, 1900.)
(No Model.)
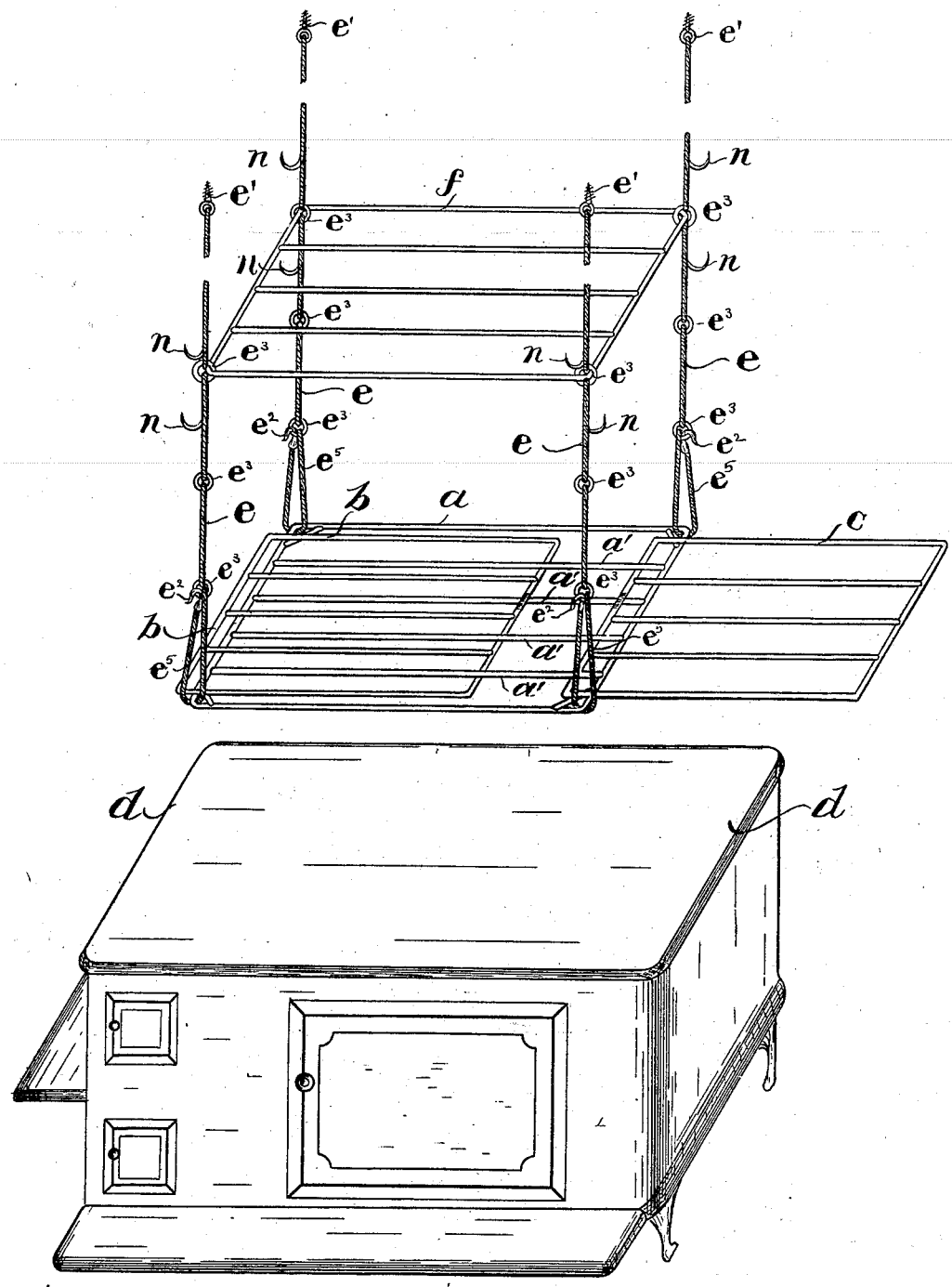
WITNESSES.
Harry M. Smith
Philip H. Coombs
INVENTOR.
Annie Bennett
by her attorney
Harry O. Robinson

UNITED STATES PATENT OFFICE.

ANNIE BENNETT, OF BREWER, MAINE.

BREAD-RAISING AND CLOTHES-DRYING DEVICE.

SPECIFICATION forming part of Letters Patent No. 648,379, dated May 1, 1900.

Application filed February 14, 1900. Serial No. 5,119. (No model.)

*To all whom it may concern:*

Be it known that I, ANNIE BENNETT, a citizen of the United States of America, and a resident of Brewer, Penobscot county, State of Maine, have invented certain new and useful Improvements in Bread-Raising and Clothes-Drying Devices, of which the following is a specification.

In families where bread is made at home it is the common custom to prepare the dough at night and set the mass in a warm place to rise until morning, when it is baked into bread. It is usual to place the vessel containing the dough at the side of the cooking-range to receive heat therefrom, and in practice difficulty is experienced in keeping the dough at an evenly-warm temperature, as is necessary to promote the rising of the dough. This is particularly the case during the winter months in houses where the fires are allowed to die down and go out some time in the night, as the dough cannot be kept at uniform temperature, the part thereof occupying a space farthest from the cooking-range becoming cold, thus delaying and stopping the complete rising of the mass.

The object of this invention is to provide a device especially adapted to keep dough for making bread at an evenly-warm temperature to promote rising.

The invention is carried out by providing a device having one or more shelves adapted to be suspended above a cooking-range and constructed and arranged to support a vessel containing dough, so that said vessel will be enveloped and completely surrounded by warm air rising from said range, which will remain warm and continue to radiate heat for a considerable time after the fire has gone out and will keep said vessel and dough contained therein at an evenly-warm temperature and facilitate and promote rising of the mass. The shelves of the device are adjustable vertically and may be moved near to the surface of the range, where the air is heated, or raised considerably above the surface thereof, where the air is cooler, and said device may be provided with hooks and extensible shelves or racks and is adapted as well for use as a clothes-drier, as will be explained.

The drawing represents the device as it appears ready for use, suspended above a cooking-range.

The letter $a$ represents the lower shelf or rack of the device, which may be made of stiff wire and formed substantially rectangular in shape, having several intermediate strengthening-wires $a'$ running lengthwise, said shelf $a$ adapted to support articles placed or hung thereon—as, for example, a bread-pan. (Not shown in the drawing.) Side shelves or racks $b$ $c$, similar in form and construction to said shelf $a$, are provided and movably attached thereto, and said side shelves $b$ $c$ are extensible laterally and may be drawn out or extended, as shown in the drawing, to hang clothes or other articles upon to dry, and when not in use said side shelves $b$ $c$ may be moved in out of the way to a position as shown in the drawing. Said shelf $a$ is supported above the cooking-range $d$ by small chains or cords $e$, which depend from screw-eyes $e'$, secured in the ceiling of the room. Said chains or cords $e$ are preferably attached to the corners of the shelf $a$ by loops $e^5$ in said chains $e$, the ends of which are provided with hooks $e^2$, adapted to hook into rings $e^3$, attached at intervals to said chains $e$, so that said shelves may be suspended near to the surface of the range $d$, where the air is heated, or raised considerably above the surface thereof, where the air is cooler, by shortening or lengthening said loops $e^5$, as will be readily understood by an inspection of the drawing. A shelf $f$, upon which articles may be hung to dry, may be provided, similar in form and construction to said shelf $a$, and said shelf $f$ may be secured in a position directly above said shelf $a$, and in practice, if desirable, said side shelves $b$ $c$ may be extensibly attached to said shelf $f$ in lieu of being attached to said lower shelf $a$. At convenient intervals along said chains $e$ hooks $n$ are attached, upon which clothes or other articles may be hung to dry.

I claim—

The combination with a cooking-range $d$ of a combined bread-raising and clothes-drying device, consisting of skeleton shelves $a$, $f$ arranged one above the other suspended above said cooking-range $d$, intermediate strengthening-bars arranged lengthwise said shelves $a$, $f$ adapted to support vessels and to receive clothes hung to dry, extensible side racks $b$, $c$ attached to one of said shelves $a$, chains $e$ having loops $e^5$ and hooks $e^3$ for adjustably suspending said shelves $a$, $f$ and hooks $n$ attached to said chains $e$ adapted to receive clothes hung to dry, substantially as described.

Signed by me at Bangor, Maine, this 9th day of February, A. D. 1900.

ANNIE BENNETT.

Witnesses:
WM. B. PEIRCE,
HARRY O. ROBINSON.